Oct. 19, 1971     W. GIERSIEPEN     3,613,352
INDICATING DEVICE

Filed June 9, 1969     7 Sheets-Sheet 1

INVENTOR
Werner GIERSIEPEN
By his ATTORNEY

Oct. 19, 1971 W. GIERSIEPEN 3,613,352
INDICATING DEVICE
Filed June 9, 1969 7 Sheets-Sheet 2

INVENTOR
Werner GIERSIEPEN
By his ATTORNEY

Oct. 19, 1971 W. GIERSIEPEN 3,613,352
INDICATING DEVICE
Filed June 9, 1969 7 Sheets-Sheet 3

INVENTOR
Werner GIERSIEPEN
By
his ATTORNEY

United States Patent Office 3,613,352
Patented Oct. 19, 1971

3,613,352
INDICATING DEVICE
Werner Giersiepen, Am Freudenberg 59,
Wuppertal-Elberfeld, Germany
Filed June 9, 1969, Ser. No. 831,785
Int. Cl. G04b 19/30
U.S. Cl. 58—50                                    28 Claims

ABSTRACT OF THE DISCLOSURE

An indicating device has a dial provided with an exposed surface. Marking means subdivides the dial and provides it with a first series of identical surface portions each of which is representative of a predetermined number of minutes, and a second series of identical surface portions each representative of a predetermined number of hours. Illuminating means sequentially illuminates at least one surface portion each of the first and second series for providing an indication of elapsed time.

BACKGROUND OF THE INVENTION

The present invention relates generally to indicating devices, and more particularly to time indicating devices especially for use in conferences or for analogous occasions, by means of optical signals on a dial surface.

Devices are already known in conference rooms or the like which for instance indicate to the speaker by means of light signals that he is approaching the end of his allotted time. Such devcies have various disadvantages.

The invention is based on the realization that as a matter of custom it is simpler to determine with a short glance a clock dial or corresponding fields of a table or plate. The invention therefore provides for a division of whatever exposed dial surface there is, into identically dimensioned surface portions which can be illuminated sequentially. This arrangement permits the continuous indication of a time period which begins with a moment which can be freely selected at any time; it overcomes the disadvantages which have existed in previous indicating devices of this type, particularly at meetings, conferences or speeches where time was limited. In such circumstances the invention provides at any time an indication of which time period has already elapsed. It is important that the period of time to be indicated can simultaneously be determined with a single glance, without requiring special attention from the person casting such glance.

SUMMARY OF THE INVENTION

It is, accordingly, an object of the present invention to overcome the disadvantages of the prior art which have been briefly outlined before, and to provide the advantages that have also been indicated.

According to my invention one feature resides, briefly stated, in the provision of an indicating device which comprises a dial having an exposed surface, marking means sub-dividing the dial and illuminating means for illuminating it. Specifically, the marking means subdivides the dial and provides at the exposed surface thereof a first series of identical surface portions each of which is representative of a predetermined number of minutes, and a second series of identical surface portions each of which is representative of a predetermined number of hours. The illuminating means serves for sequentially illuminating at least one surface portion each of the first and second series for providing an indication of elapsed time.

According to the invention the time to be indicated, beginning with the starting of operation of the indicating device, can be shown either time-proportional or in jumps or intervals which may be larger or smaller. This makes it possible in a particularly clear and easy manner to determine which time period from the beginning of indication has already elapsed, and this is indicated either continuously or at intervals, for instance at five-minute intervals.

The clarity of indication is further enhanced if the surface portions into which the dial surface is divided are either of different colors or illuminated with different colors; thus, by the choice of colors a particular emphasis may be placed on the indication, and such colors may for instance be used in the sequence blue, green, yellow and red.

With the invention it is also possible to indicate time periods larger than one hour, for instance by providing two concentric circles which are segmentally subdivided with the segments being illuminated in such a manner that the segments of the outer circle advantageously indicate the elapsed minutes and the segments of the inner circle the elapsed hours. In this case, when one hour has elapsed the illumination of the outer circle disappears briefly and begins again with the initial or starting segment. This makes it possible in very clear manner to indicate up to thirteen hours with a high degree of accuracy.

However, it is also possible to use a table, a plate, a light ribbon or the like, for instance installed on or in a writing desk, and in this case in one direction, for instance in horizontal direction, a certain indication such as the minutes from 5–60 may be given, whereas in direction normal to the one direction, that is in vertical direction, the hours may be shown subdivided in groups indicating 1–12 hours.

Instead of indicating the entire elapsed time with an illuminated surface area, it can also be advantageous to have only a single surface portion illuminated in color or otherwise at any time, so that the single surface portion will advance analogous to the minute or hour hand of a clock, and it may do so either continuously or at intervals. However, it is also possible to have a surface area increase in size until it is completely illuminated and indicates a given time period, such as fifteen minutes, whereupon it will be darkened and a new consecutive surface area, located downstream of the first one as seen in the direction of indication of the time, is similarly illuminated, preferably in a different color. This is then repeated for the entire time which is to be measured.

To take into account a pause in proceedings, or an interruption, means may be provided for switching off the novel device temporarily so that it will be arrested at whatever stage of time indication it has reached, and will resume its indicating function only when it is reactivated.

It is also possible to set the device at the will of the user, for instance if a time measurement by the device begins belatedly and this additional time cannot be added at the end.

As a switching arrangement which controls the illumination of the dial, there is preferably provided a rotary switch which may for instance be selectively engageable in coupling sense with the shaft of the timer, particularly with the minute shaft and which will then rotate with the same. The rotary switch may be arranged on two guides for axial shifting and may be biassed by springs in a sense in which the coupling connection is established between it and the shaft, a pressure plate serving as abutment for the springs which is held by a known device, for instance a pushbutton, in two stable positions. An inclined guide arrangement turns the rotary switch to its starting position. A hand wheel or the like additionally makes possible manual adjustment.

The rotary switch activates the bulbs with increasing time in increasing numbers, these bulbs being evenly distributed located behind the dial in light chambers behind lighted transmissive portions of the dial. A second similarly constructed switch may be coupled with the hour shaft and may control further chains of bulbs or groups of bulbs which indicate the elapsed hours. The bulbs may be connected in series with a compensating resistance which serves to supply electrical energy at a potential which is as independent as possible from the number of bulbs being illuminated. If the electrical energy supplied by the source is alternating current, then a capacitor may especially advantageously be used as compensating resistance.

Advantageously the dial is provided with means for selective marking of individual surface portions. Such means may be markers which can be provided as riders or the like and can be pushed into, hung onto or slidably connected with receiving means associated with the respective surface portions. Alternately, electrical switching means may be provided which serve for selectively applying optical or acoustic signals to desired surface portions. Furthermore, the dial may be provided with a writing surface or with sheet material members or the like which serve as writing surface and which may be provided with lines and accept indicia intended for certain of the surface portions. Such sheet material members may be stacked adjacent the dial or connected in form of a writing pad so that marginal comments may be made applicable to certain of the surface portions of the dial. The subdivision of the dial into different surface portions may be reproduced on these sheet material members.

One such sheet material member may be applied upon the dial and may be light transmissive. Advantageously, the dial is surrounded by a frame which receives one sheet material member at a time which can be constructed as a lectern or the like. The sheet material members may be subdivided in correspondence with the surface portions of the dial, as already indicated, to form columns or the like in a manner analogous to those well known from daily, weekly, monthly or the like calendars. This makes it possible to indicate clearly and readily even the elapse of large time periods in a manner analogous to calendars of the aforementioned type and is advantageous for use not only with conferences but also with work sequences, production sequences and the like. The dial may be subdivided by divider walls which indicate the various surface portions, and may be located in a box or other receptacle which is covered with a ground-glass or analogous member.

The electrical switching means may serve for controlling purposes, for instance for the distribution of acoustical or optical signals to personnel or the like from a conference table or from a desk. Also, it is for instance possible to indicate work sequences or work shifts of eight hours each either in an optical or an acoustical manner in their progress on such dials, particularly plate-shaped dials, and they can then be readily compared with one another. Acoustical or optical signals may also serve to direct the attention of the user to a particular term.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 12 shows diagrammatically a control arrangement for controlling signals and the like;

DESCRIPTION OF THE PREFERRED EMBODIMENTS

Figure 1:
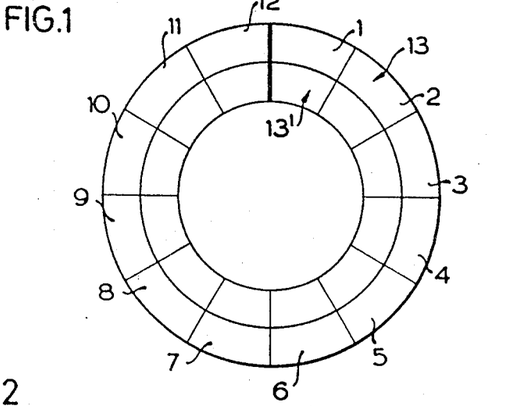
FIG. 1 is a diagrammatic view showing a dial according to one embodiment of the invention.

Discussing firstly the embodiment in FIG. 1 it will be seen that here the dial is configurated in form of a circle which is divided into an outer annular portion 13 and an inner annular portion 13' concentric with the portion 13. Each of the portions 13 and 13' is subdivided into twelve segment-shaped surface portions 1–12 and these may either be of different colors, or the bulbs still to be described may be such that the different segment-shaped surface portions will be illuminated in different colors. For instance, the first three surface portions 1–3 could be blue, the next three could be green, the next three could be yellow and the final three could be red. Evidently, other possibilities exist.

In the embodiment of FIG. 1 the outer annulus 13 indicates the elasped time in minutes, each segment 1 of the outer annulus 13 corresponding to five minutes. The inner annulus 13' indicates the elapsed time in hours, and each segment of the inner annulus 13 is the equivalent of one hour. Of course, this could be reversed. In the illustrated embodiment, however, if one hour has elapsed then the twelve segments of the outer annulus 13—which are fully illuminated after fifty-five minutes have passed— are darkened and the first segment 1 of the inner annulus 13' becomes illuminated. At the same time illumination of the outer annulus 13 begins again with the first segment 1 of the same. This makes it possible to indicate very reliably and with great accuracy elapsed times up to thirteen hours. Independently of the respective position of the hour or minute hands and beginning with the initiation of operation of the device, the segment 1 will be illuminated and subsequently the additional segments 2, 3 etc. will become illuminated as additional time elapses. This illumination may be either time-proportional—that is it may be progressive and continuous—or it may be in jumps or intermittently that the segment 1 of the outer annulus 13 for instance becomes illuminated only after the first five minutes have elapsed, with the subsequent segments being illuminated in the same manner.

Figure 2:
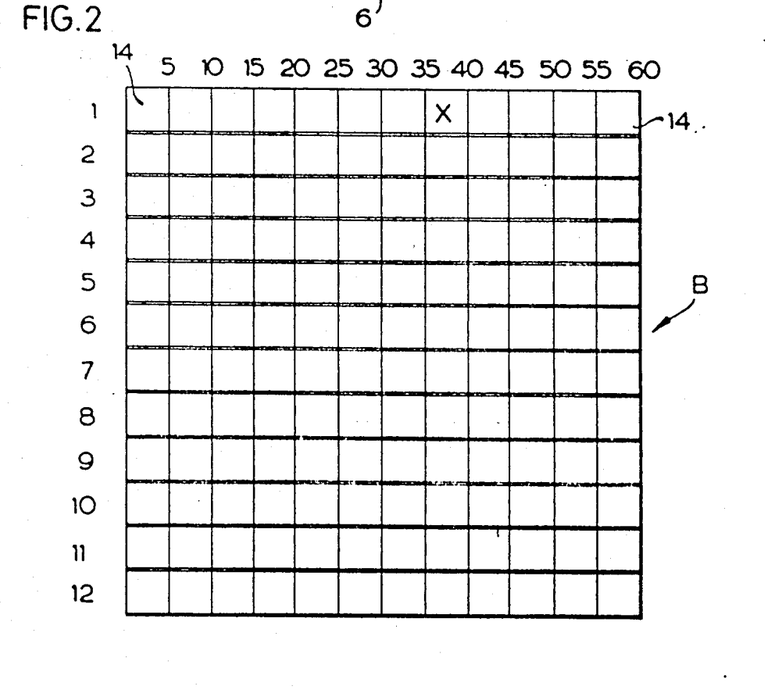
FIG. 2 is a view similar to FIG. 1 but illustrating a dial according to another embodiment of the invention.

As shown in FIG. 2, the different embodiment illustrated therein utilizes a board or table B which may for instance be installed on or in the desk for programming and controlling the time of an entire working day, but which may also of course be mounted on a wall or the like. According to the number of minutes and hours to be indicated, the board B is subdivided into a plurality of surface portions 14 which may for instance be arranged in horizontal rows with each surface portion corresponding to an elapsed time of five minutes and with twelve surface portions being provided per row, and in a vertical row corresponding to the hours 1–12. The surface portions may again be color coated, for instance in that the surface portions including the period 5–25 minutes are green or are illuminated with green light, the surface portions 30–60 minutes blue, and the like. The cross shown between the markings 35 and 40 in FIG. 2 indicates the advancing time indication which can be freely selected beginning with any desired moment. The cross, it will be understood, of course, indicates that the respective surface portion has become illuminated.

The time can be indicated optically by illumination of the surface portions, either time-proportional or advancing in more or less large stages, so that it is possibly to quickly and readily ascertain which time period has already elapsed beginning from the initiation of operation of the device.

Figure 3:
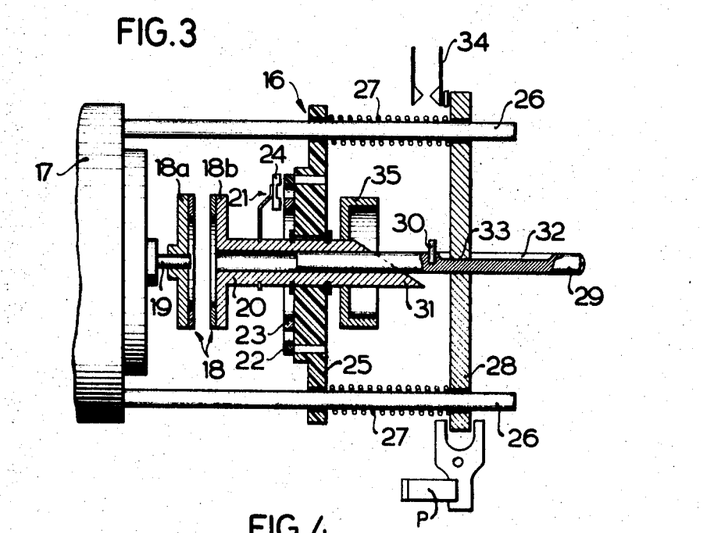
FIG. 3 is a fragmentary diagrammatic illustration of a switching device according to the invention.
Figures 4, 5, 6:
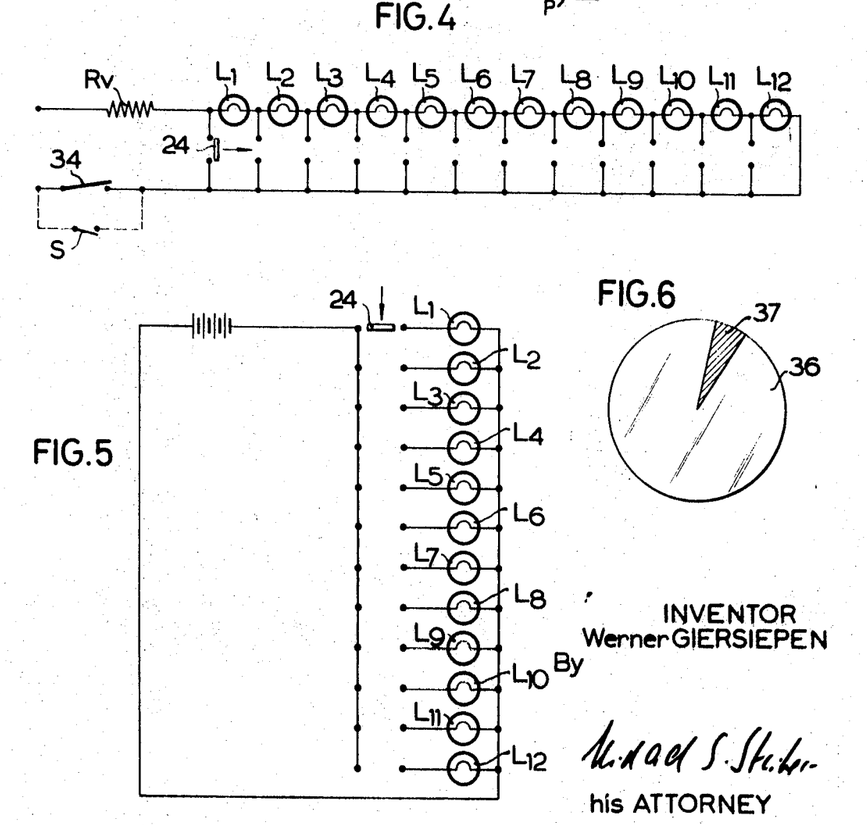
FIG. 4 is a circuit diagram showing the control of bulbs for use in the apparatus according to the present invention.
FIG. 5 is a view analogous to FIG. 4 but showing a further embodiment.
FIG. 6 is a diagrammatic illustration showing mechanical control via an advancing segment.

FIG. 3 shows a switching device for controlling the operation of a dial such as is shown in FIG. 1, and FIG. 4 shows the circuit associated with the switching device of FIG. 3. The device in FIG. 3 comprises a switching arrangement 16 which is coupled with a clock or timer 17, a friction coupling 18 being provided between a shaft 19 of the minute hand of the clock 17, and the device 16. Specifically, one section 18a of the friction coupling 18 is mounted on the shaft 19 and continuously turns with the shaft 19. The other section 18b of the coupling 18 is rigid with a switching member 20 of an electrical switch 21 which is provided on its circumference at identical spacing with contacts 22, for instance 12 thereof, which can be connected with a center contact 23 via a bridge member 24. The switch 21 has a base plate 25 on which the other components are mounted and this plate 25 is axially slidably mounted on two guides 26 and the switch can therefore be urged by springs 27 towards the clock 17 so that the coupling sections 18a and 18b engage. A pressure plate 28 is provided against which the springs 27 bear so that, when the coupling sections 18a and 18b are in engagement, the switching member 20 and the switch 21 turn with the shaft 19. The pressure plate 28 is on the one hand held fast in such a manner that the switch 21 is rotated by the clock 17, and on the other hand in such a manner that the coupling sections 18a and 18b are in engagement with one another. For this reason a suitable device, for instance a pushbutton P, is provided for effecting movement of the pressure plate 28 in this sense, the device having two stable positions each of which corresponds to one position of the pressure plate 28.

A return 29 with a follower 30 can be moved axially against a cam member 31 so that the follower 30 takes the switching member 20 along and returns it to its starting position. The return 29 is prevented from turning by itself via a groove 32 into which a projection 33 of the pressure plate 28 engages. The return 29 to starting or zero position is configurated as a plunger which is pressed in and brings the follower 30 into contact with the cam member 31 to effect turning to starting position.

The pressure plate 28 is associated with a switch 34 which closes when the coupling sections 18a and 18b engage one another and which opens when the coupling no longer turns the switch. The switch 21 rotates with the switching member 20 in the direction of the arrow, the bulbs $L_1$–$L_{12}$ shown in FIG. 4, which become illuminated in increasing number with an increase in the elapsed time and which are evenly distributed in light chambers behind the light transmissive dial so as to illuminate the segments 1–12 as discussed with respect to FIG. 1. A similar device can be coupled with the shaft of the hour hand and control a second series of bulbs which indicates the elapsed hours on the annulus 13' of FIG. 1.

The construction of the switch is particularly simple when the bulbs are connected in series as shown in FIG. 4. As compensating resistance $Rv$ for producing a current whose potential is an independent as possible from the number of illuminated bulbs $L_1$–$L_{12}$, I preferably use a capacitor if the current supplied by the source of electrical current is alternating current. This keeps the current requirement to a minimum. The switch 34 switches the circuit on or off. Shown in parallel thereto and in phantom lines is a switch S which makes possible during a pause the illumination of the last-illuminated surface portion without any continuity in the indication of elapsed time during this pause.

Switching of the bulbs $L_1$–$L_{12}$ can be such that at the beginning of a new time unit—such as five minutes—the surface portion associated therewith is fully illuminated, or that it becomes illuminated only after the time unit has elapsed. A hand wheel 35 shown in FIG. 3 additionally makes it possible to adjust the switch at will, particularly with respect to the cam 31.

The bridge member 24 shown in FIG. 5 will permit, when moved in the direction of the arrow, the illumination of only one surface portion 13 or one of the bulbs $L_1$–$L_{12}$, so that the indication advances in accordance with the elapsed time in the manner of a light pointer. This is important particularly where energy is to be conserved, for instance where the device is to be operated with batteries. FIG. 6 shows the corresponding mechanical arrangement where it will be seen that a disc 36 with a cutout segment 37 is provided in front of a dial, whereas a lamp is arranged behind the dial and illuminates the entire dial. The bulb or lamp is not separately shown.

Figure 7:
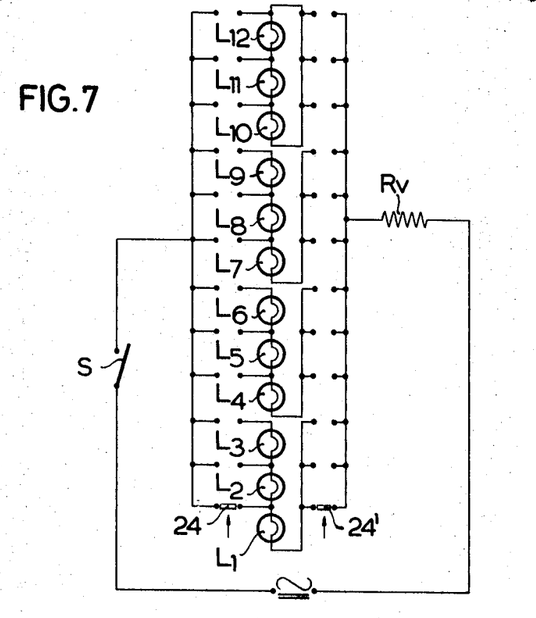
FIG. 7 is a view analogous to FIGS. 4 and 5 but showing a further embodiment of the invention.

Coming now to FIG. 7 it will be seen that here the board is again subdivided and that any one surface portion initially has an increasingly larger area illuminated, and it is then switched off after a predetermined time, for instance 15 minutes, with a new surface portion becoming illuminated, located downstream of the one which has just been switched off, that is downstream as seen with the direction of advancement. Advantageously the surface portions are differently colored. The compensating resistance is again identified with reference character $Rv$ and switching on and switching off is accomplished by the switch S. The bulbs $L_1$–$L_{12}$ in FIG. 7 are arranged in groups of three series and are switched on and off in groups as in FIG. 4 through the bridging member 24 which is associated with the minute hand, one switching member 24' being coupled with and turning with the hour hand.

Figure 8:
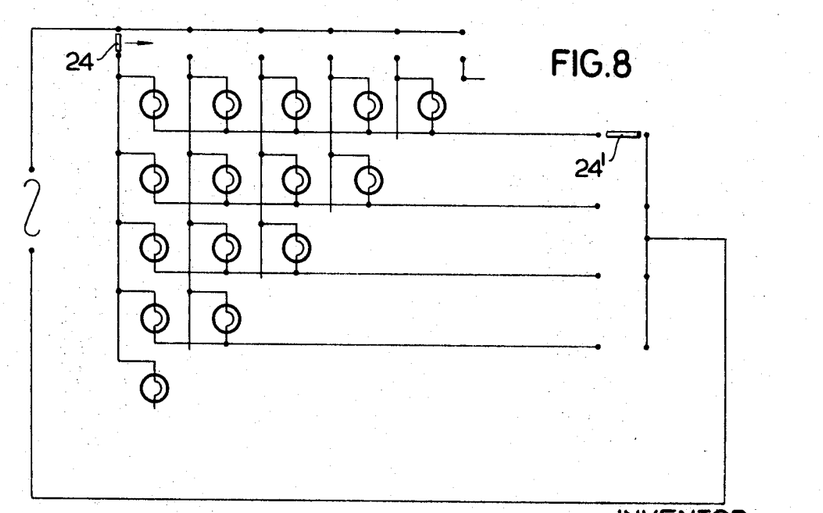
FIG. 8 is a circuit diagram showing control of bulbs associated with an embodiment as shown in FIG. 2.

In FIG. 8 the switch 24 is coupled with the minute hand and arranged in association with the horizontal, whereas the switch 24' is coupled with the hour hand and associated with the vertical, so that the surface portions 14 of the board B are illuminated sequentially and in rows one after the other. The surface portion being illuminated, that is in this case always only one, indicate how many time units—here in five-minute sections—have elapsed from the beginning of the operation.

Figure 9:
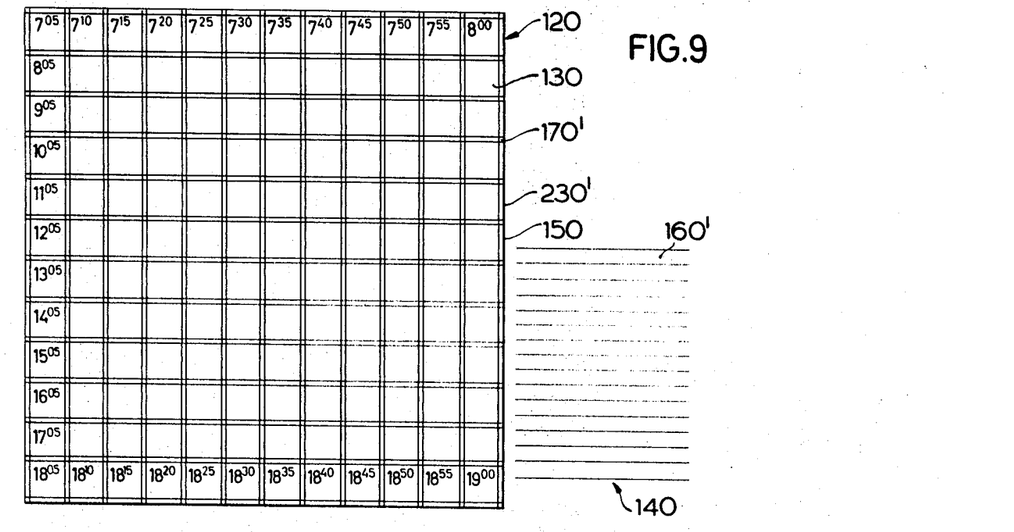
FIGS. 9 and 10 each shows a dial of different size, with associated writing surface of different size.
Figure 10:
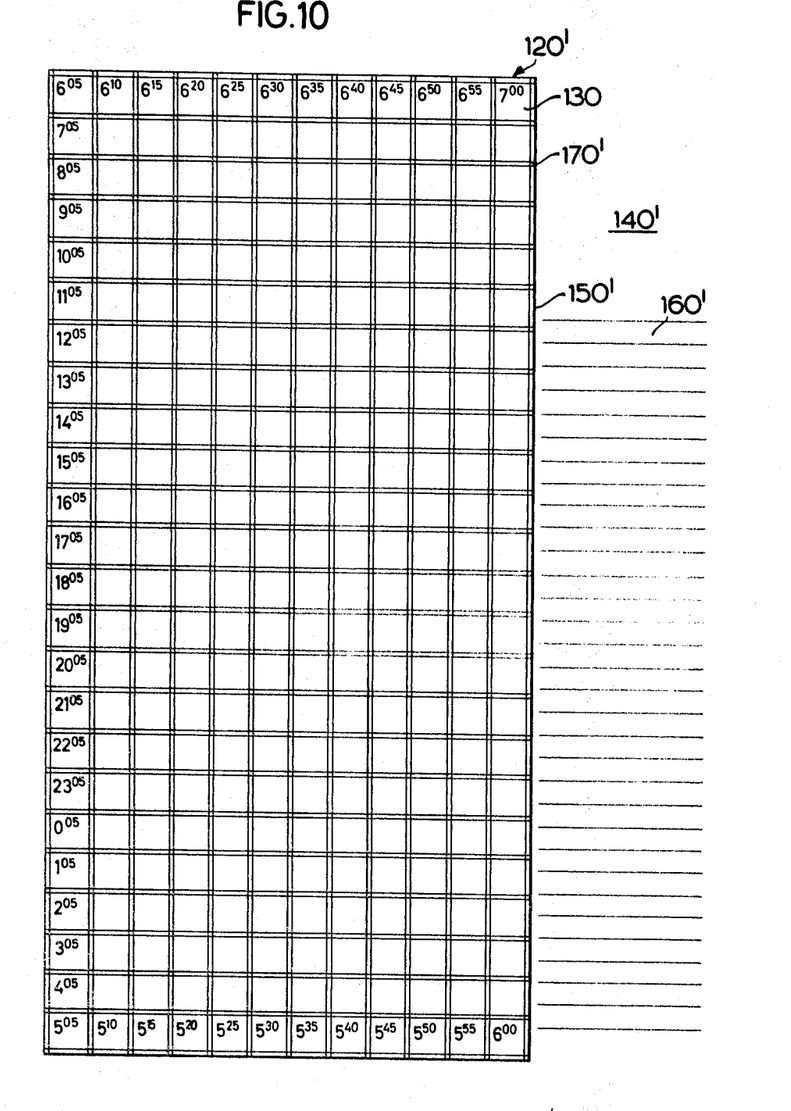

In FIGS. 9 and 10 the board is identified with reference numeral 120 and provided with successive surface portions 130 which are marked at five-minute intervals. The indication may be accompanied by optical acoustical signals, as still to be discussed. The surface portions 130 are provided with time indications 605, 705 . . . and formed by provision of wall portions 170' which may be covered by ground glass or the like.

The board 120 in FIG. 9 is of quadratic outline and serves for supervising the time period of twelve hours, for instance from 7:00 a.m. to 7:00 p.m., the latter being the equivalent of 1900 hours. For programming purposes a sheet 140—for instance of the size corresponding to German industrial norm DIN A 5—is placed onto the board 120 and provided with lineations 150 and 160' corresponding to the walls 170', with the sheet 140 being provided with the time indications 705 . . . corresponding to those on the board 120.

The lineation 160' is intended for marginal comments and may be provided for instance in the lower corner of the sheet 140. The upper corner may be left free for general remarks such as date, day and the like, whereas the lineation 160' may serve for entry of comments which are particularly relevant to certain time segments as identified by surface portions 130. The walls 170' form a frame and thereby accept and hold the sheet 140 on three sides.

In FIG. 10 the board 120' serves for controlling an entire working day of twenty-four hours and is of rectangular outline. The sheet 140 is replaced with the sheet 140' which is larger than that of FIG. 9 and which is provided with a lineation 150' corresponding to that of the board 120, which lineation is provided with the hour and minute indications 605, 705 . . . . Additional space is provided on the sheet 140' as in FIG. 9 also.

The sheets 140 or 140' may be separated by use of perforations or the like for purposes of simpler programming from the surface portion provided for the lineation 160', or may be connected in form of a pad which is arranged adjacent the dial 120 on the conference table or the desk and secured to the board or dial 120.

The sheets 140 or 140' may also be quadratically removable, with perforations being provided and with the sheets being located in a frame 230 formed by the walls 170'. Also, the sheets 140 may be provided with perforations corresponding to the lineation 150 by lines or columns. Entries may be directly made into the lineation 150 and the sheets 140 may again be either stacked or connected in form of a pad, such as a calendar of the like.

Figure 11:
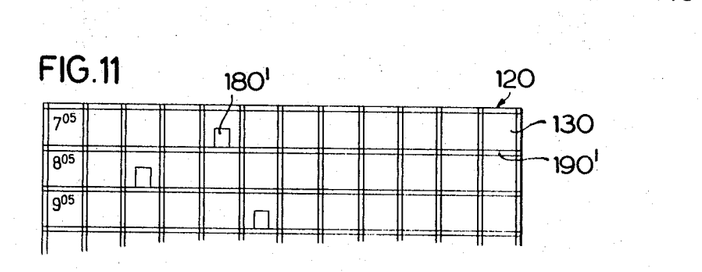
FIG. 11 shows a dial with markers provided thereon.

In FIG. 11 the board 120, which may also be otherwise configurated, is provided with markers 180' in individual surface portions 130 which are slidable on or pushable into slats 190' and which may be marked in accordance with their meaning. The designation of the markers 180' may be entered into a lineation 150 on a sheet 140 and there be explained. The markers 180' may also be riders which can be hung onto or into the slats 190 and which may be of different colors.

Figure 12:
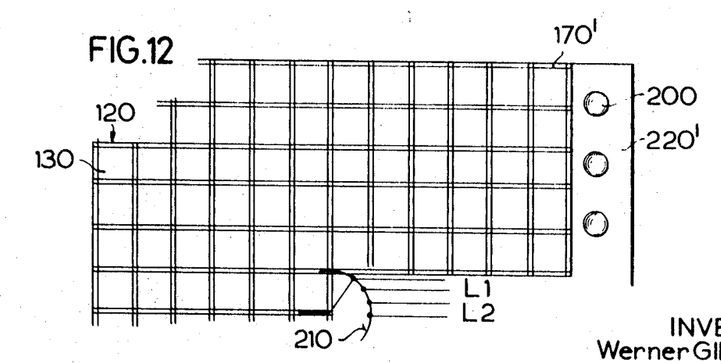

FIG. 12 shows that pushbuttons are provided in the switching arrangement for a rotary switch 210 which sequentially switches on the bulbs L associated with the dial 120, and which pushbuttons are associated with a control board 220'. A pushbutton 200 is provided for switching on the rotary switch 210; the two other pushbuttons serve for switching off or momentarily switching on the bulbs L. In place of the pushbuttons 200 it would also be possible to use foot operated switches or the like if their operation is to be unnoticed by persons other than the user, or is to be carried out in addition to other tasks and simultaneously therewith.

In FIG. 12 the rotary switch 210 is provided at the center of the quadratic board 120 with its surface portions 130, and is connected with the switching arrangement.

The signals may be applied in addition to the surface portions of a dial (such as FIGS. 1, 6) or a board and may for instance be colored. Also, the signals may be given acoustically or optically in differently rapid sequence, for instance as additional blinking.

Figure 13:
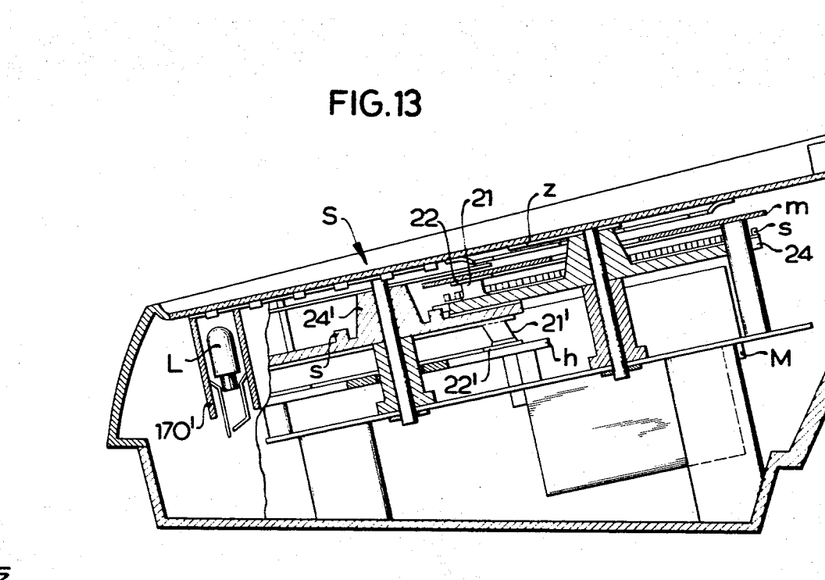
FIG. 13 is a section taken on line XIII—XIII of FIG. 14.
Figure 14:
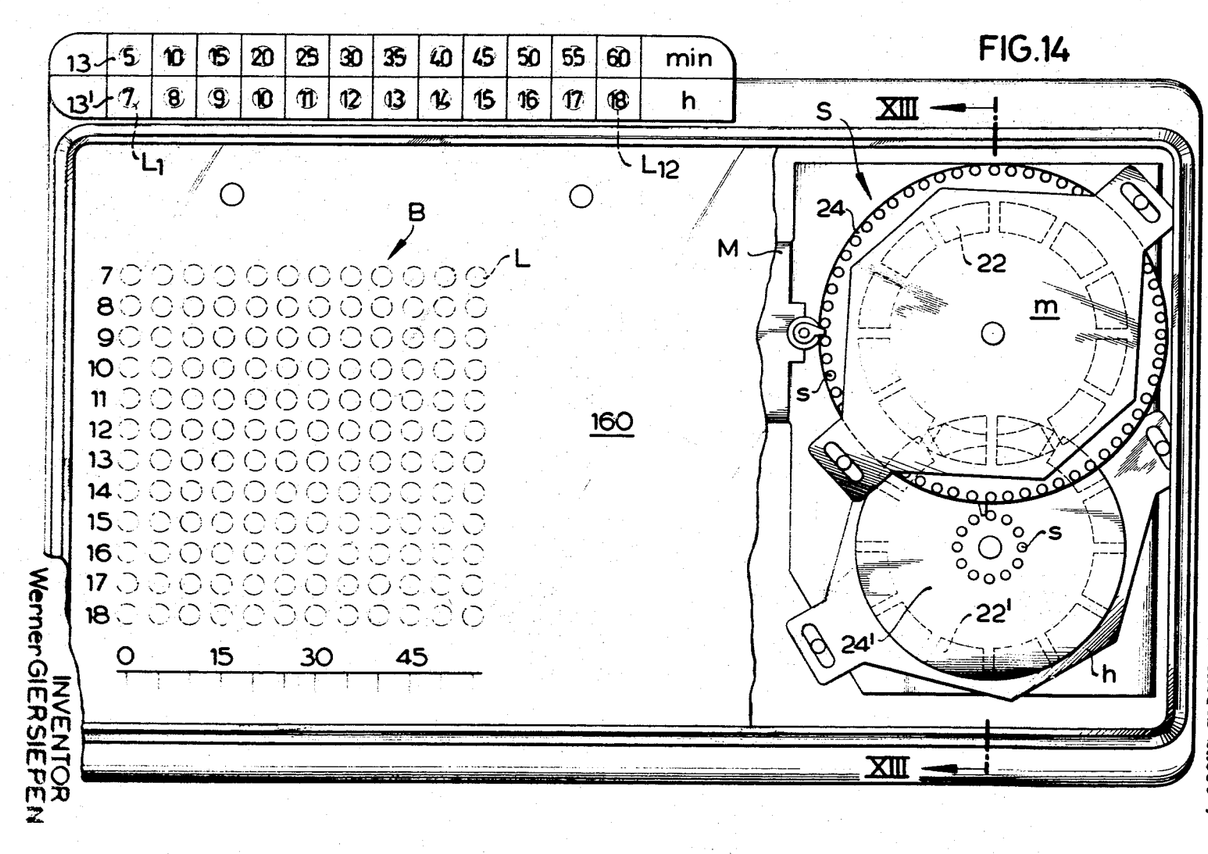
FIG. 14 is a top view of the novel indicating device with a portion of the outer casing removed.

FIG. 14 shows two linear time scales 13 and 13' which are coordinated with the lamps $L_1$–$L_{12}$, and at the right side of this figure there is shown a synchronous switch S which is coordinated with the previously-mentioned field B. As shown in FIG. 13, this switch S comprises a rotating switch 24 for the minutes, and another rotating switch 24' for the hous. A stationary minute disc $m$ and a stationary hour disc $h$, each having twelve contact segments 22, are respectively adapted to cooperate with the switches 24 and 24', the latter being driven by the synchronous motor M via axially extending small pins $s$.

As already indicated the various figures show only exemplary embodiments of the invention and the latter is not to be considered limited thereto. Other embodiments and applications are possible. Thus, a light ribbon or the like can serve as the indicating surface and the invention can also be used in an automotive vehicle for indicating the time for a traversed distance. It is also possible, for instance in FIG. 2, for programming purposes to cover portions of the dial from time-to-time differently with colored light-transmissive elements with the individual colors having different meanings, such as red standing for a board of directors' meeting, green for the time to review mail, blue for a meeting of department heads, and the like. Also, the dial of the embodiment of FIG. 1 may be replaced with a rectangular board provided with two rows of surface portions 13, 13' located one below the other so that in the upper row the minutes and in the lower row the hours may be indicated. The embodiment of the switch shown in FIG. 3 may be varied in different manners also.

Advantageously, the dial may be scanned with a ribbon or tape which is convoluted about rollers and which is provided with staggered apertures for passage of a light beam issuing from a light source. The light source may be arranged centrally to the dial. The apertures scan seriatim the surface portions 13 of the dial in the direction of advancement of the ribbon. The staggering is at distances corresponding to the hours 1, 2 . . . in the longitudinal direction of the ribbon whose length correspond to the number of hours to be indicated; this means that if twelve hours are to be indicated the ribbon is provided with twelve apertures staggered with reference to one another, and if eighteen hours are to be indicated eighteen staggered apertures are provided.

It will be understood that each of the elements described above, or two or more together, may also find a useful application in other types of constructions differing from the types described above.

While the invention has been illustrated and described as embodied in an indicating device, it is not intended to be limited to the details shown, since various modifications and structural changes may be made without departing in any way from the spirit of the present invention.

What is claimed as new and desired to be protected by Letters Patent is set forth in the appended claims:

1. A time indicating device for conferences or the like, comprising in combination, a dial having an exposed light transmissive surface; marking means subdividing said dial and providing at said exposed surface a first series of identical surface portions respectively representative of consecutive and equal minute time units, and a second series of identical surface portions respectively representative of consecutive and equal hour time units; illuminating means including electric light bulbs located on the side of said dial opposite said exposed surface for sequentially illuminating at least one surface portion each of said first and second series for providing an indication of time elapsed from a starting time selected at the will of a user; timer means having rotary shaft means; rotary switch means and coupling means mounting means mounting said rotary switch means for sliding movement between two positions in one of which said coupling means couples said rotary switch means with said shaft means for rotation by and with said shaft means; and auxiliary switch means operatively associated with said rotary switch means and said bulbs for energizing the latter in dependence upon operation of the former.

2. An indicating device as defined in claim 1, wherein said first and second series of surface portions are arranged in form of respective concentric rings, with each of said surface portions having the shape of a ring segment.

3. An indicating device as defined in claim 1, wherein each of said series of surface portions is subdivided into a plurality of groups of consecutive surface portions, and wherein the surface portions of the different groups have different colors.

4. An indicating device as defined in claim 1, wherein each of said series of surface portions is subdivided into a plurality of groups of consecutive surface portions and wherein said illuminating means is operative for illuminating the surface portions of the different groups with different colors.

5. An indicating device as defined in claim 1, wherein said dial is of quadrangular outline, and wherein said first and second series are arranged on said dial in rows.

6. An indicating device as defined in claim 1, said mounting means including a plate member adjustable for movement between two stable end positions, and said spring means bearing upon said plate member.

7. An indicating device as defined in claim 1, said rotary switch means being operative for energizing and de-energizing said bulbs in groups each of which comprises a plurality of consecutive bulbs of the respective series.

8. An indicating device as defined in claim 1, said timer shaft means including a minute-indicating timer shaft and an hour-indicating timer shaft, and said rotary switch means including two discrete rotary switches each of which is associated with one of said timer shafts via said coupling means.

9. An indicating device as defined in claim 8, wherein one of said rotary switches is rotatable about one axis having a predetermined relationship with reference to the general plane of said dial, and wherein the other of said rotary switches is rotatable about an other axis transverse to said one axis.

10. An indicating device as defined in claim 1, wherein said surface portions each have an upstream edge proximal to the preceding surface portion and a downstream edge proximal to the succeeding surface portion, and wherein said illuminating means illuminates the respective surface portions progressively so that the illuminated area of each illuminated surface portions progressively increases from the respective upstream edge to the respective downstream edge.

11. An indicating device as defined in claim 1, further comprising interrupting means associated with said illuminating means and operative for interrupting operation thereof at the will of a user.

12. An indicating device as defined in claim 1, and further comprising compensating resistance means operative for supplying said electrical bulbs with electrical energy at a potential which is independent of the number of bulbs being supplied.

13. An indicating device as defined in claim 12 further comprising a source of alternating current, and wherein said compensating resistance means comprises a capacitor.

14. An indicating device as defined in claim 1, said illuminating means being operative for effecting illumination of the respective surface portions sequentially and continuously in proportion to elapsed time.

15. An indicating device as defined in claim 1, said illuminating means being operative for effecting illumination of the respective surface portions sequentially but at intervals corresponding to the number of time units of which the respective surface portions are representative.

16. An indicating device as defined in claim 1, wherein each illuminated surface portion remains illuminated at least until all surface portions of the respective series are illuminated.

17. An indicating device as defined in claim 1, and further comprising indicating means associated with said dial and operative for indicating respective areas of said surface portions at the will of a user.

18. An indicating device as defined in claim 17, said indicating means comprising indicating members arranged to be associated with the respective surface portions so as to at least in part overlie and be visible on said surface portions at the will of a user.

19. An indicating device as defined in claim 1, and further comprising indicia-receiving means associated with said dial, and having an indicia-receiving face, and auxiliary marking means subdividing said face with plurality of indicia-receiving sections.

20. An indicating device as defined in claim 19, wherein said auxiliary marking means subdivides said indicia-receiving face into indicia-receiving sections corresponding to said surface portions of said dial.

21. An indicating device as defined in claim 19, wherein said indicia-receiving means comprises sheet-material members dimensional so as to be accommodatable within the outline of said dial.

22. An indicating device as defined in claim 21, wherein said sheet-material members are supported on said dial for facilitating the making of indicia on said members.

23. An indicating device as defined in claim 19, wherein said dial comprises a sheet portion provided with said exposed surface, a frame portion framing said sheet portion, and divider portions dividing said sheet portion into said surface portions and constituting said marking means.

24. An indicating device as defined in claim 19, wherein said indicia-receiving means comprises sheet-material members arranged laterally adjacent said exposed surface.

25. An indicating device as defined in claim 24, wherein said sheet-material members are connected and constitute a pad.

26. An indicating device as defined in claim 1, and further comprising pushbutton means associated with said illuminating means for controlling the operation thereof at the will of a user.

27. An indicating device as defined in claim 19, wherein said indicia-receiving means comprises sheet-material members dimensioned larger than said exposed surface so as to extend therebeyond when juxtaposed with said exposed surface.

28. An indicating device as defined in claim 1 and including setting means associated with said illuminating means and operative for starting sequential illuminating of said surface portions from surface portions selected at the will of the user.

References Cited

UNITED STATES PATENTS

| | | | |
|---|---|---|---|
| 2,745,243 | 5/1956 | Schumacher | 58—50 |
| 3,003,305 | 10/1961 | Goldman | 58—50 |
| 3,015,094 | 12/1961 | Reynolds, Jr. | 58—50 |
| 3,186,158 | 6/1965 | Miller | 58—50 X |
| 3,258,906 | 7/1966 | Demby | 58—50 |
| 3,410,082 | 11/1968 | Taylor et al. | 58—50 |
| 3,439,492 | 4/1969 | Gravenson | 58—1 |
| 3,456,152 | 7/1969 | Andersen | 58—50 |

RICHARD B. WILKINSON, Primary Examiner

E. C. SIMMONS, Assistant Examiner

U.S. Cl. X.R.

58—39.5, 148, 152